(12) United States Patent
Glenn

(10) Patent No.: US 8,191,395 B2
(45) Date of Patent: *Jun. 5, 2012

(54) ALIGNMENT DEVICE AND METHODS OF USING THE SAME

(75) Inventor: Douglas W. Glenn, Des Moines, WA (US)

(73) Assignee: Fatigue Technology, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,643

(22) Filed: Mar. 14, 2011

(65) Prior Publication Data

US 2011/0277306 A1   Nov. 17, 2011

Related U.S. Application Data

(63) Continuation of application No. 12/590,990, filed on Nov. 16, 2009, now Pat. No. 7,926,318, which is a continuation of application No. 11/796,544, filed on Apr. 27, 2007, now Pat. No. 7,617,712.

(60) Provisional application No. 60/796,171, filed on Apr. 27, 2006.

(51) Int. Cl.
*B21D 37/00* (2006.01)
*F16B 37/04* (2006.01)

(52) U.S. Cl. ........ 72/391.4; 72/393; 29/53; 29/243.518; 29/523

(58) Field of Classification Search .......... 29/243, 29/53, 243.518, 523, 524.1, 525; 72/391.4, 72/391.6, 393

See application file for complete search history.

(56) References Cited

U.S. PATENT DOCUMENTS

| 295,593 A | 3/1884 | Thayer |
| 810,430 A | 1/1906 | Pfluger et al. |
| 1,081,496 A | 12/1913 | Gillmor |
| 1,106,964 A | 8/1914 | Pahler |
| 1,226,090 A | 5/1917 | Ludlum |
| 1,297,142 A | 3/1919 | Gibbons |
| 1,480,298 A | 1/1924 | Pearson |
| 1,881,867 A | 10/1932 | Nelson |
| 1,979,686 A | 11/1934 | Hall et al. .......................... 85/40 |
| 2,092,358 A | 9/1937 | Robertson ....................... 285/56 |

(Continued)

FOREIGN PATENT DOCUMENTS

DE   2203217   7/1973

(Continued)

OTHER PUBLICATIONS

Merriam Webster's Collegiate Dictionary, Tenth Edition, 1997, p. 154.

*Primary Examiner* — David Jones
(74) *Attorney, Agent, or Firm* — Seed IP Law Group PLLC

(57) ABSTRACT

An alignment device is located on a mandrel of an installation tool and is used to align a structural member in an opening of a workpiece while seating a radial flange of the structural member against a first surface of the workpiece. The alignment device comprises a disk-shaped device having an outer surface, an inner surface forming an opening through the alignment device, and where the opening is sized to be at least slightly smaller than a major diameter of an expansion portion of the mandrel. In one embodiment, the alignment is nylon to allow the inner surface of the alignment device to be repeatedly, radially expanded and yet the opening formed by the inner surface returns to its original size.

16 Claims, 12 Drawing Sheets

U.S. PATENT DOCUMENTS

| | | | | |
|---|---|---|---|---|
| 2,146,461 A | 2/1939 | Bettington | | 218/29 |
| 2,150,361 A | 3/1939 | Chobert | | 153/79 |
| 2,188,596 A | 1/1940 | Hobert | | 16/2 |
| 2,275,451 A | 3/1942 | Maxwell | | 29/157.5 |
| 2,357,123 A | 8/1944 | Maxwell | | 153/80.5 |
| 2,385,294 A | 9/1945 | Lowy | | 16/3 |
| 2,405,399 A | 8/1946 | Bugg et al. | | 153/80 |
| 2,430,554 A | 11/1947 | Bugg et al. | | 153/80 |
| 2,433,425 A | 12/1947 | Burckle | | 285/84 |
| 2,468,985 A | 5/1949 | Krotz | | 287/85 |
| 2,528,180 A | 10/1950 | Roehl | | 248/56 |
| 2,661,182 A | 12/1953 | Kipp | | 251/76 |
| 2,672,175 A | 3/1954 | Howard | | 153/80 |
| 2,695,446 A | 11/1954 | Meyer | | 29/523 |
| 2,700,172 A | 1/1955 | Rohe | | 16/2 |
| 2,808,643 A | 10/1957 | Weatherhead, Jr. | | 29/508 |
| 2,943,667 A | 7/1960 | Ewing et al. | | 153/80 |
| 3,128,999 A | 4/1964 | Schmitt | | 267/1 |
| 3,137,887 A | 6/1964 | Mannino et al. | | 16/2 |
| 3,149,860 A | 9/1964 | Hallesy | | 285/18 |
| 3,164,054 A | 1/1965 | Biesecker | | 85/8.8 |
| 3,244,034 A | 4/1966 | Severdia | | 77/62 |
| 3,252,493 A | 5/1966 | Smith | | 151/41.7 |
| 3,345,730 A | 10/1967 | Laverty | | 29/243.52 |
| 3,358,492 A | 12/1967 | Richter | | 72/393 |
| 3,434,746 A | 3/1969 | Watts | | 285/162 |
| 3,498,648 A | 3/1970 | Hallesy | | 285/343 |
| 3,537,163 A | 11/1970 | Steidl | | 29/149.5 |
| 3,566,662 A | 3/1971 | Champoux | | 72/370 |
| 3,674,292 A | 7/1972 | Demler, Sr. | | 285/174 |
| 3,693,247 A | 9/1972 | Brown | | 29/512 |
| 3,763,541 A | 10/1973 | Jaffe | | 29/212 D |
| 3,778,090 A | 12/1973 | Tobin | | 285/222 |
| 3,787,945 A | 1/1974 | Pasek et al. | | 29/157.4 |
| 3,820,297 A | 6/1974 | Hurd | | 52/758 F |
| 3,835,525 A | 9/1974 | King, Jr. | | 29/412 |
| 3,875,649 A | 4/1975 | King, Jr. | | 29/418 |
| 3,892,121 A | 7/1975 | Champoux et al. | | 72/393 |
| 3,895,409 A | 7/1975 | Kwatonowski | | 16/2 |
| 3,915,052 A | 10/1975 | Ruhl | | 85/7 |
| 3,934,325 A | 1/1976 | Jaffe | | 29/243.52 |
| 3,949,535 A | 4/1976 | King, Jr. | | 52/758 D |
| 3,997,193 A | 12/1976 | Tsuda et al. | | 285/47 |
| 4,143,580 A | 3/1979 | Luhm | | 85/77 |
| 4,164,807 A | 8/1979 | King, Jr. | | 29/523 |
| 4,187,708 A | 2/1980 | Champoux | | 72/30 |
| 4,249,786 A | 2/1981 | Mahoff | | 339/15 |
| 4,355,612 A | 10/1982 | Luksch | | 123/41.08 |
| 4,386,515 A | 6/1983 | Starke | | 72/391 |
| 4,397,061 A | 8/1983 | Kanzaka | | 16/2 |
| 4,405,256 A | 9/1983 | King, Jr. | | 403/408 |
| 4,423,619 A | 1/1984 | Champoux | | 72/393 |
| 4,425,780 A | 1/1984 | Champoux | | 72/370 |
| 4,447,944 A | 5/1984 | Mohrman | | 29/512 |
| 4,471,643 A | 9/1984 | Champoux et al. | | 72/391 |
| 4,482,089 A | 11/1984 | Lindahl et al. | | 228/173 C |
| 4,522,378 A | 6/1985 | Nelson | | 267/141.4 |
| 4,524,600 A | 6/1985 | Champoux et al. | | 72/391 |
| 4,530,527 A | 7/1985 | Holmberg | | 285/382.4 |
| 4,557,033 A | 12/1985 | Champoux | | 29/525 |
| 4,583,388 A | 4/1986 | Hogenhout | | 72/393 |
| 4,597,282 A | 7/1986 | Hogenhout | | 72/370 |
| 4,640,456 A | 2/1987 | Shely et al. | | 248/56 |
| 4,665,732 A | 5/1987 | Hogenhout | | 72/393 |
| 4,699,212 A | 10/1987 | Andersson et al. | | 165/167 |
| 4,755,904 A | 7/1988 | Brick | | 361/177 |
| 4,759,237 A | 7/1988 | Fauchet et al. | | 81/53.2 |
| 4,787,793 A | 11/1988 | Harris | | 411/339 |
| 4,809,420 A | 3/1989 | Landy et al. | | 29/523 |
| 4,869,091 A | 9/1989 | Shemeta | | 72/393 |
| 4,885,829 A | 12/1989 | Landy | | 29/156.8 R |
| 4,905,766 A | 3/1990 | Dietz et al. | | 169/91 |
| 4,934,038 A | 6/1990 | Caudill | | 29/523 |
| 4,934,170 A | 6/1990 | Easterbrook et al. | | 72/370 |
| 4,985,979 A | 1/1991 | Speakman | | 29/512 |
| 4,999,896 A | 3/1991 | Mangus et al. | | 29/34 B |
| 5,038,596 A | 8/1991 | Noonan et al. | | 72/391.4 |
| 5,069,586 A | 12/1991 | Casey | | 411/339 |
| 5,083,363 A | 1/1992 | Ransom et al. | | 29/523 |
| 5,093,957 A | 3/1992 | Do | | 16/2 |
| 5,096,349 A | 3/1992 | Landy et al. | | 411/108 |
| 5,103,548 A | 4/1992 | Reid et al. | | 29/507 |
| 5,110,163 A | 5/1992 | Benson et al. | | 285/382.2 |
| 5,127,254 A | 7/1992 | Copple et al. | | 72/370 |
| 5,129,253 A | 7/1992 | Austin et al. | | 72/370 |
| 5,207,461 A | 5/1993 | Lasko | | 285/222 |
| 5,218,854 A | 6/1993 | Jarzebowicz et al. | | 72/370 |
| 5,245,743 A | 9/1993 | Landy et al. | | 29/523 |
| 5,253,773 A | 10/1993 | Choma et al. | | 230/86.2 |
| 5,305,627 A | 4/1994 | Quincey et al. | | 72/370 |
| 5,341,559 A | 8/1994 | Reid et al. | | 29/523 |
| 5,380,111 A | 1/1995 | Westrom | | 402/74 |
| 5,380,136 A | 1/1995 | Copple et al. | | 411/183 |
| 5,390,808 A | 2/1995 | Choma et al. | | 220/86.2 |
| 5,405,228 A | 4/1995 | Reid et al. | | 411/183 |
| 5,433,100 A | 7/1995 | Easterbrook et al. | | 72/391.2 |
| 5,466,016 A | 11/1995 | Briody et al. | | 285/204 |
| 5,478,122 A | 12/1995 | Seabra | | 285/281 |
| 5,607,194 A | 3/1997 | Ridenour | | 285/334.5 |
| 5,609,434 A | 3/1997 | Yehezkieli et al. | | 403/260 |
| 5,713,611 A | 2/1998 | Kurimoto et al. | | 285/382.5 |
| 5,722,312 A | 3/1998 | Kristensen | | 92/171.1 |
| 5,806,173 A | 9/1998 | Honma et al. | | 29/727 |
| 5,885,318 A | 3/1999 | Shimizu et al. | | 65/493 |
| 5,943,898 A | 8/1999 | Kuo | | 72/370.07 |
| 5,947,326 A | 9/1999 | O'Hern et al. | | 220/802 |
| 6,058,562 A | 5/2000 | Satou et al. | | 16/2.1 |
| 6,131,964 A | 10/2000 | Sareshwala | | 285/382 |
| 6,217,082 B1 | 4/2001 | Orcutt et al. | | 285/272 |
| 6,266,991 B1 | 7/2001 | Kuo | | 72/370.07 |
| 6,289,577 B1 | 9/2001 | Tanaka et al. | | 29/603.03 |
| 6,328,513 B1 | 12/2001 | Niwa et al. | | 411/339 |
| 6,347,663 B1 | 2/2002 | Hunzinger et al. | | 165/178 |
| 6,488,460 B1 | 12/2002 | Smith et al. | | 411/353 |
| 6,499,926 B2 | 12/2002 | Keener | | 411/504 |
| 6,623,048 B2 | 9/2003 | Castel et al. | | 285/382 |
| 6,651,301 B1 | 11/2003 | Liu | | 29/243.521 |
| 6,705,149 B2 | 3/2004 | Cobzaru et al. | | 72/391.4 |
| 6,761,380 B2 | 7/2004 | Pachciarz et al. | | 285/204 |
| 6,773,039 B2 | 8/2004 | Muenster et al. | | 285/259 |
| 6,796,765 B2 | 9/2004 | Kosel et al. | | 415/142 |
| 6,826,820 B2 | 12/2004 | Denham et al. | | 29/524.1 |
| RE38,788 E | 9/2005 | Satou et al. | | 16/2.1 |
| 7,024,908 B2 | 4/2006 | Poast et al. | | 72/391.2 |
| 7,047,596 B2 | 5/2006 | Sucic et al. | | 16/2.1 |
| 7,059,816 B2 | 6/2006 | Toosky | | 411/181 |
| 7,100,264 B2 | 9/2006 | Skinner et al. | | 29/523 |
| 7,375,277 B1 | 5/2008 | Skinner et al. | | 174/18 |
| 7,406,777 B2 | 8/2008 | Grover et al. | | 33/645 |
| 7,448,652 B2 | 11/2008 | Poast et al. | | 285/136.1 |
| 2004/0111864 A1 | 6/2004 | Skinner et al. | | 29/523 |
| 2007/0110541 A1 | 5/2007 | Rawlins et al. | | 411/54.1 |
| 2007/0289351 A1 | 12/2007 | Glenn | | 72/370.07 |
| 2008/0005887 A1 | 1/2008 | Glenn et al. | | 29/523 |
| 2008/0034831 A1 | 2/2008 | Glenn | | 72/370.07 |
| 2008/0066518 A1 | 3/2008 | Glenn et al. | | 72/370.07 |
| 2008/0250603 A1 | 10/2008 | Skinner et al. | | 16/12 |

FOREIGN PATENT DOCUMENTS

| | | |
|---|---|---|
| DE | 33 01 849 C1 | 7/1984 |
| DE | 3545554 A1 | 7/1987 |
| DE | 89 01 317 U1 | 3/1989 |
| EP | 0 054 592 A1 | 6/1982 |
| EP | 0 140 516 A1 | 5/1985 |
| EP | 0 248 122 A2 | 12/1987 |
| EP | 0 891 007 A1 | 1/1999 |
| EP | 0 945 919 B1 | 9/1999 |
| EP | 1166951 A1 | 1/2002 |
| EP | 1 202 458 A1 | 5/2002 |
| EP | 1525952 A1 | 4/2005 |
| EP | 1611976 A1 | 1/2006 |
| EP | 1 903 221 A2 | 3/2008 |
| FR | 2645052 | 10/1990 |
| GB | 593604 | 10/1947 |
| GB | 1395009 | 5/1975 |
| GB | 2 239 917 A | 7/1991 |
| JP | 57137031 | 8/1982 |

| | | | | | | |
|---|---|---|---|---|---|---|
| JP | 60238046 A | 11/1985 | | SU | 632463 | 11/1978 |
| JP | 61157846 | 7/1986 | | WO | 8400120 A1 | 1/1984 |
| JP | 10-274366 | 10/1998 | | WO | 2007082077 A1 | 7/2007 |
| JP | 2001-177964 | 6/2001 | | WO | 2007121932 A1 | 11/2007 |

ALIGNMENT DEVICE AND METHODS OF USING THE SAME

CROSS-REFERENCE TO RELATED APPLICATIONS

This application is a continuation of U.S. patent application Ser. No. 12/590,990, filed Nov. 16, 2009, which is a continuation of U.S. patent application Ser. No. 11/796,544, filed Apr. 27, 2007, now issued as U.S. Pat. No. 7,617,712 on Nov. 17, 2009 which claims the benefit under 35 U.S.C. §119(e) of U.S. Provisional Patent Application No. 60/796,171 filed Apr. 27, 2006. All of these applications and U.S. patent are incorporated herein by reference in their entireties.

BACKGROUND

1. Field of Disclosure

This disclosure generally relates to an alignment device for aligning a structural member, such as a bushing, as the structural member is being radially expanded and installed into a workpiece.

2. Description of the Related Art

Structural members, such as conventional bushings with radial flanges, are commonly installed into openings of workpieces for a variety of reasons. For example, the body of the bushing typically reinforces or structurally supports the region around the opening. In addition, the radial flange of the bushing may operate as a washer to transmit the fastener clamp-up loads into the workpiece and/or structural joint, define a bearing surface for bolts, define a wear surface, and the like.

One method for installing bushings, especially in components that will undergo repetitive load cycles and/or may be susceptible to accumulating fatigue damage, is the FORCE-MATE® installation method developed by Fatigue Technology, Inc. The FORCEMATE® installation method utilizes an expansion mandrel received in an installation tool. The mandrel is passed through a passage in the bushing after the bushing has been placed in the opening of the workpiece. The mandrel radially expands the bushing into the opening to obtain a controlled, but consistently higher, interference fit than would be achievable by other installations methods, such as shrink or press fitting methods. In addition, the FORCE-MATE® installation method may induce beneficial residual compressive stresses into the structural material surrounding the opening, which may advantageously extend the fatigue and damage tolerance (i.e., crack growth) life of the component, assembly, and/or installation. The FORCEMATE® installation method, as well as other cold-working methods, tooling, and the like, such as the BUSHLOC®, FORCETEC®, and FLEXMATE® methods are described in U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; 5,433,100; and in U.S. patent application Ser. Nos. 09/603,857; 10/726,809 (U.S. Pat. No. 7,100,264); Ser. No. 10/619,226 (U.S. Pat. No. 7,024,908); and Ser. No. 10/633,294 (US/2005/0025601). Other techniques for radially expanding the structural member into the workpiece may use a hydraulic or a pneumatic actuated installation tool that is capable of moving the expansion mandrel through the structural member with a large amount of force.

One drawback with at least some of the aforementioned installation techniques and/or tools is that the weight of the installation tool may influence the alignment of the expansion mandrel relative to the structural member and/or the opening in the workpiece. In addition, the mandrel pulling force generated by the tool to pull the mandrel through the structural member has nothing to react against the pulling force until an expansion portion of the mandrel contacts and actually begins to expand the structural member. If such initial contact occurs when the structural member is misaligned in the opening of the workpiece, then the large pulling force, which may be 20,000 pounds or greater, tends to radially expand the structural member into the workpiece in the misaligned orientation.

As a result, gaps may occur between the radial flange of the structural member and the corresponding surface of the workpiece. The gaps may adversely affect the ability of the radial flange of the bushing to transmit the fastener clamp-up loads into the workpiece. Further, the gaps may result in the structural member failing to meet specific flushness requirements. Thus, the gaps may require that a post-installation seating process be performed on the structural member to properly seat the radial flange against the workpiece. If the gaps are too big, the installed structural member may have to be removed from the opening and replaced with another structural member, which may require re-drilling and oversizing the opening in the workpiece. Additionally or alternatively, residual stresses that may be intended to be induced into the workpiece during the radial expansion of the structural member may be non-uniform, or even non-existent, in some regions across the thickness of the workpiece.

Based on the foregoing, it would be desirable to have an alignment device that can be used with an installation tool to more predictably install the structural member while overcoming at least some of the aforementioned drawbacks.

SUMMARY

At least one embodiment generally relates to an alignment device that can be used with a standard mandrel of an installation tool, where the alignment device operates to sufficiently co-axially align the mandrel and a structural member relative to an opening in a workpiece. In one embodiment, the alignment device is a nylon disk having a passageway extending through the disk, where the passageway is sized to be slightly smaller than a major diameter of an expansion portion of the mandrel. As an expansion portion of the mandrel radially expands the disk, a nose section of the installation tool is urged into tight contact with a radial flange of the structural member. In addition, the pull force of the mandrel urges a contacting surface of the alignment device against a back surface of the workpiece. The cooperation of the alignment device and the installation tool is sufficient to seat or clamp the radial flange of the structural member against a front surface of the workpiece while aligning the structural member in the workpiece. Hence, subsequent operations to "seat" the flange onto the workpiece are not necessary.

In one aspect, an alignment device to be used with a mandrel of an installation tool to seat a radial flange of a structural member against a first surface of a workpiece, the radial flange is located at a first end of the structural member and the alignment device includes an outer surface; an inner surface forming an opening through the alignment device, the inner surface having an inner diameter sized to be at least slightly smaller than a major diameter of an expansion portion of the mandrel; and a contacting surface extending substantially from the inner surface to the outer surface, the contacting surface sized to abut at least a portion of an end surface of the structural member and at least a portion of a second surface of the workpiece, the second surface of the workpiece opposing the first surface of the workpiece, the end surface of the structural member opposing the first end of the structural member with the radial flange.

In another aspect, a method of installing a structural member into an opening in a workpiece includes pulling an expansion portion of a mandrel through an alignment device, the alignment device positioned against a first surface of the workpiece, the alignment device having an inner surface forming an opening therethrough, the opening having an inner diameter that is at least slightly smaller than a major diameter of an expansion portion of the mandrel; seating a radial flange of the structural member tightly against a second surface of the workpiece as the expansion portion of the mandrel is pulled through the opening of the alignment device, the second surface of the workpiece opposing the first surface of the workpiece; aligning the structural member with the workpiece as the expansion portion of the mandrel is pulled through the opening of the alignment device; and pulling the expansion portion of the mandrel through the structural member to radially expand and secure the structural member to the workpiece.

In yet another aspect, a method of installing a structural member into an opening in a workpiece includes moving a first portion of a mandrel through an alignment device, the alignment device having an inner surface forming an opening through the alignment device, the opening having an inner diameter that is at least slightly less than a major diameter of an expansion portion of the mandrel; moving the first portion of the mandrel through a passage formed in the structural member after the structural member is located in the opening of the workpiece; engaging the mandrel in the installation tool, the tool located on an opposite side of the workpiece from the alignment device; abutting a nose section of the installation tool against at least a portion of a radial flange located on a first end of the structural member; and activating the installation tool to pull the expansion portion of the mandrel through the opening in the alignment device, where an amount of force necessary to pull the expansion portion of the mandrel through the opening in the alignment device is reacted by the nose section of the installation tool, and where the nose section applies an amount of pressure to the radial flange of the structural member to seat the radial flange tightly against a first surface of the workpiece, the first surface located on the opposite side of the workpiece.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale and some of these elements are arbitrarily enlarged and positioned to improve drawing legibility. Further, the particular shapes of the elements as drawn are not intended to convey any information regarding the actual shape of the particular elements and have been solely selected for ease of recognition in the drawings.

DETAILED DESCRIPTION

In the following description, certain specific details are set forth in order to provide a thorough understanding of various disclosed embodiments. However, one skilled in the art will understand that the embodiments may be practiced without these details. In other instances, well-known structures and methods associated with cold working and/or installing a bushing, sleeve, liner, or other similar component into an opening in a workpiece may not be shown or described in detail to avoid unnecessarily obscuring descriptions of the disclosed embodiments. It is appreciated and understood that the process of installing the component into the opening of the workpiece may or may not result in the creation of an annular zone of residual compressive stress in the workpiece or workpieces.

In the following description and for purposes of brevity, reference shall be made to cold working and/or radial expanding of the workpiece. This reference is not intended to limit or otherwise narrow the scope of the disclosure. The process of cold expansion is to be broadly interpreted as any process that radially expands at least some of the material surrounding the opening in the workpiece, even if the expansion is for the purpose of impeding the growth of a fatigue crack. It is further understood that cold expanding the opening of the workpiece may or may not induce beneficial compressive residual stresses and may or may not produce fatigue-enhancing benefits in the workpiece.

Unless the context requires otherwise, throughout the specification and claims which follow, the word "comprise" and variations thereof, such as "comprises" and "comprising," are to be construed in an open, inclusive sense, that is as "including, but not limited to."

The headings provided herein are for convenience only and do not interpret the scope or meaning of the claimed invention.

The following description relates to an alignment device for aligning a structural member with an opening in a workpiece before and/or during radial expansion of the structural member into the workpiece. The structural member may be, but is not limited to, a bushing, sleeve, liner, or other component.

Figure 1:
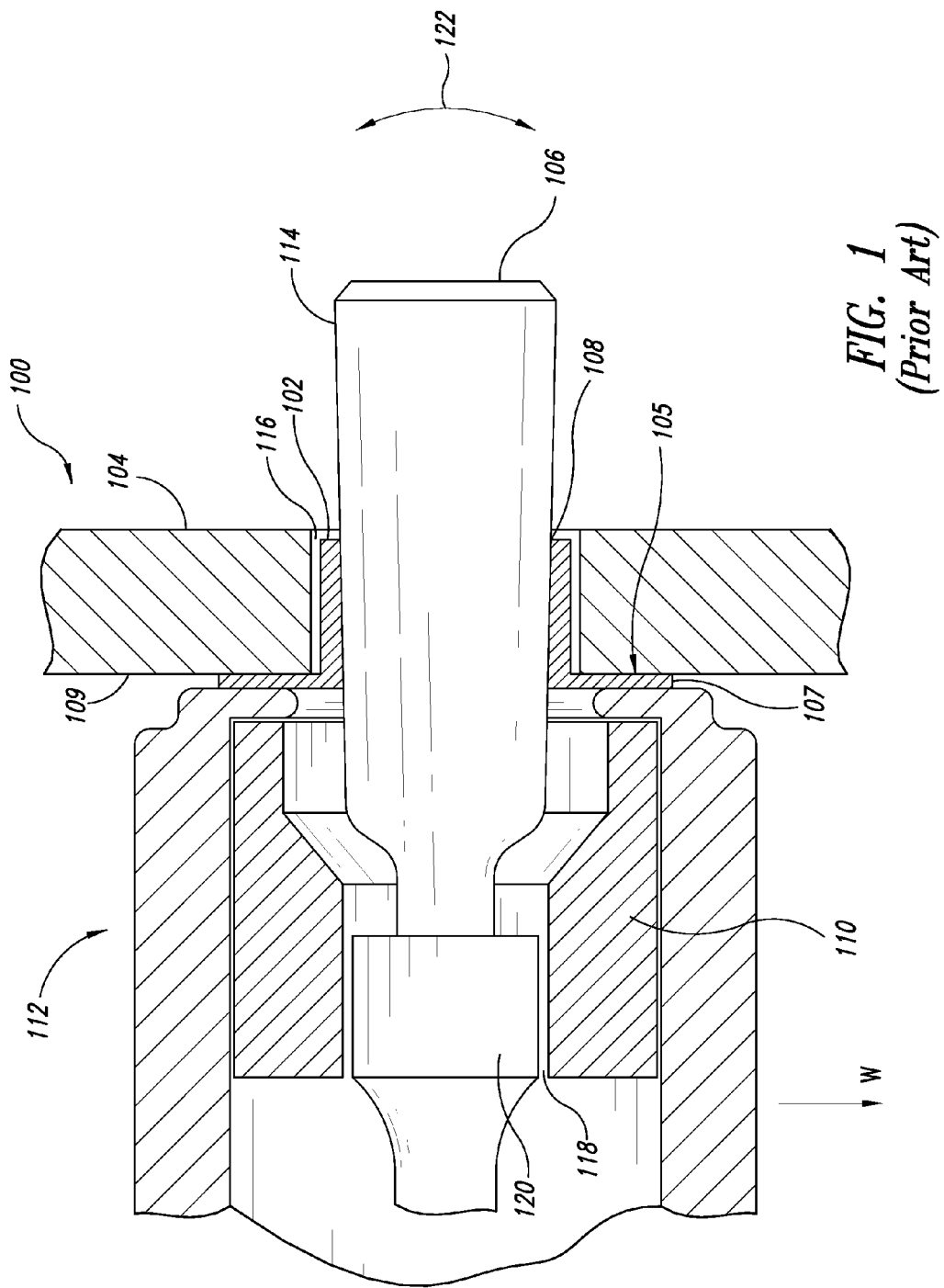
FIG. 1 is a cross-sectional view of a conventional installation comprising a structural member located in a workpiece, wherein the structural member is about to be radially expanded into the workpiece with a mandrel received by an installation tool.

FIG. 1 shows an installation 100 including a structural member 102 about to be radially expanded into a workpiece 104. An expansion mandrel 106 can be passed through an opening 108 in the structural member 102 to expand the structural member 102. The mandrel 106 is held by guide members 110 located within an installation tool 112. The installation tool 112 is capable of pulling or pushing the mandrel 106 through the opening 108 with an extremely high force (e.g., an axial force in the direction of a longitudinal axis of the mandrel 106).

During the installation process of radially expanding the structural member 102 in the workpiece 104, the expansion mandrel 106 should be sufficiently co-axially aligned with the structural member 102, which in turn should be co-axially aligned with the opening 108 in the workpiece 104. This co-axial alignment, when achieved, permits a more uniform distribution of the compressive residual stresses induced into the workpiece 104 and results in a workpiece contact face 105 of a radial flange 107 of the structural member 102 being placed in tight contact with the corresponding workpiece surface 109.

However, just before an expansion portion 114 of the mandrel 106 enters the structural member 102, the structural member 102 may or may not be adequately aligned in the workpiece 104. Several parameters may cause misalignment of the structural member 102 with respect to the workpiece 104, such as a first amount of clearance 116 between an outer perimeter of the pre-installed structural member 102 and the workpiece 104, a second amount of clearance 118 between the guide members 110 of the installation tool 112 and a first portion 120 of the mandrel 106, or the like. The first and second amount of clearance 116, 118 may occur due to part tolerances. Optionally, the second amount of clearance 118 between the guide members 110 and the first portion 120 of the mandrel 106 may arise or increase after repeated use of the installation tool 112. The clearances 116, 118 may permit some amount of radial play or float of the mandrel 106 and/or the structural member 102, as indicated by the arrows 122.

Further, the weight W of the tool 112 may also factor into the amount of misalignment because often times the structural members 102 are installed with the tool 112 being supported by only one installer or mechanic, without any sort of alignment aid. In FIG. 1, the clearances 116, 118 are exaggerated for exemplary purposes and many internal components of the installation tool 112 are not shown for clarity and brevity.

Figure 2:
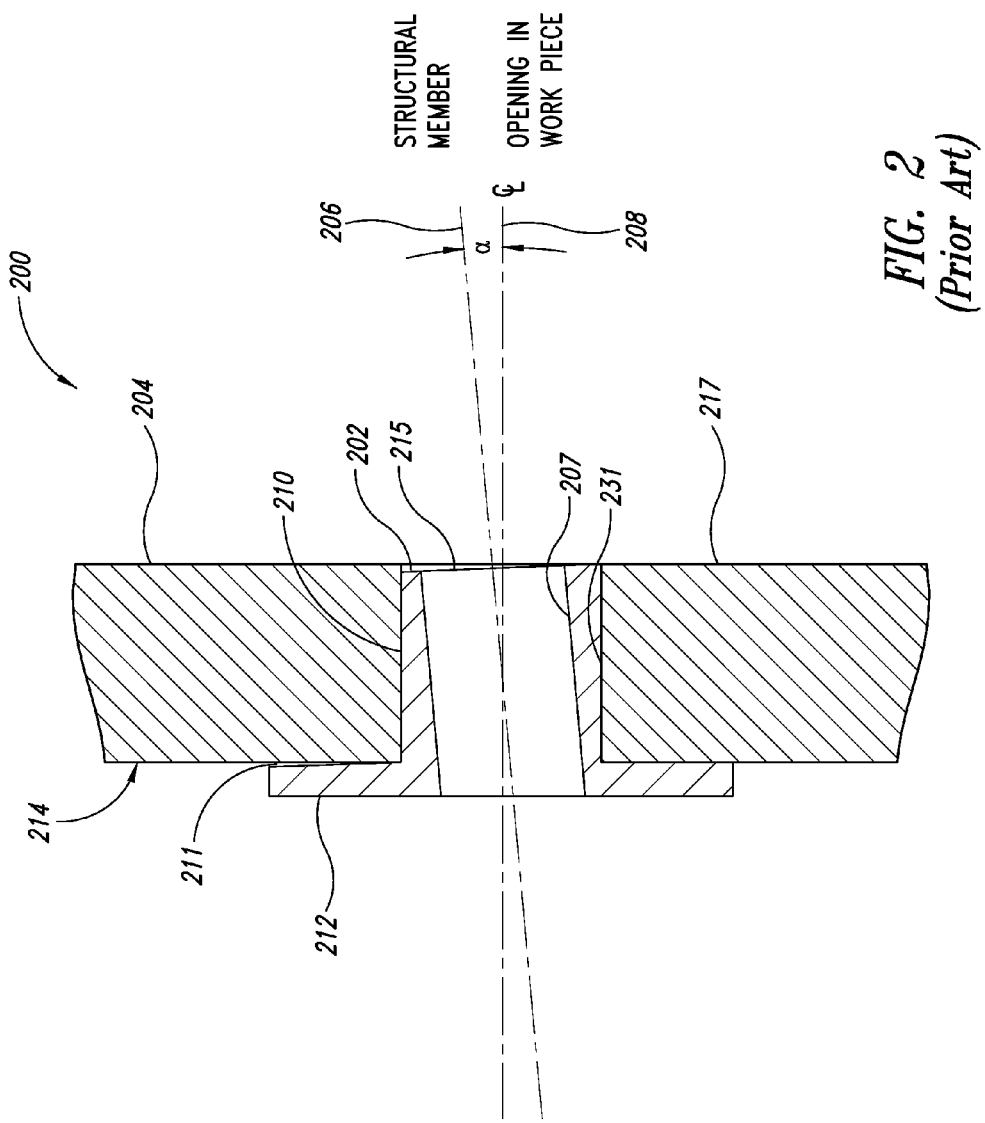
FIG. 2 is a cross-sectional view of a structural member installed into a workpiece with a misaligned orientation.

FIG. 2 shows another installation 200 having a post-installed structural member 202 that has been radially expanded into a workpiece 204. The illustrated structural member 202 is misaligned with an opening 210 in the workpiece 204. A longitudinal axis 206 of a passage 207 of the structural member 202 is not aligned with respect to a centerline axis 208 of the opening 210 in the workpiece 204. The illustrated longitudinal axis 206 of the passage 207 is angled with respect to the centerline axis 208 of the opening 210. An angle α is defined between the longitudinal axis 206 and the centerline axis 208. The misalignment of the structural member 202 creates a gap or space 211 between a radial flange 212 of the structural member 202 and a corresponding face 214 of the workpiece 204. The gap 211 can permit unwanted movement between the radial flange 212 and the workpiece 204 and, consequently, may adversely effect the fatigue performance of the installation 200. The gap 211 can also impact corrosion resistance, loading conditions, stresses (e.g., stresses in the structural member 202 and the workpiece 204), bearing area, or the like. For example, liquid (e.g., water or chemicals) may pass through the gap 211 and accumulate between the structural member 202 and the workpiece 204. The liquid can cause unwanted corrosion at or near the interface of the structural member 202 and the workpiece 204.

An end 215 of the structural member 202 may be spaced from an outer surface 217 of the workpiece 204. In some embodiments, including the illustrated embodiment of FIG. 2, the end 215 is spaced inwardly from the outer surface 217. In some embodiments, the end 215 extends outwardly past the surface 217. The surface 219 of the end 215 may be non-parallel with the outer surface 217 and, thus, may result in non-uniform loading along the inner surface 231 of the workpiece 204. Misalignment of the expansion mandrel may also impact the flushness of the flange 212 and/or the opposing end 215 of the structural member 202.

Figure 3:
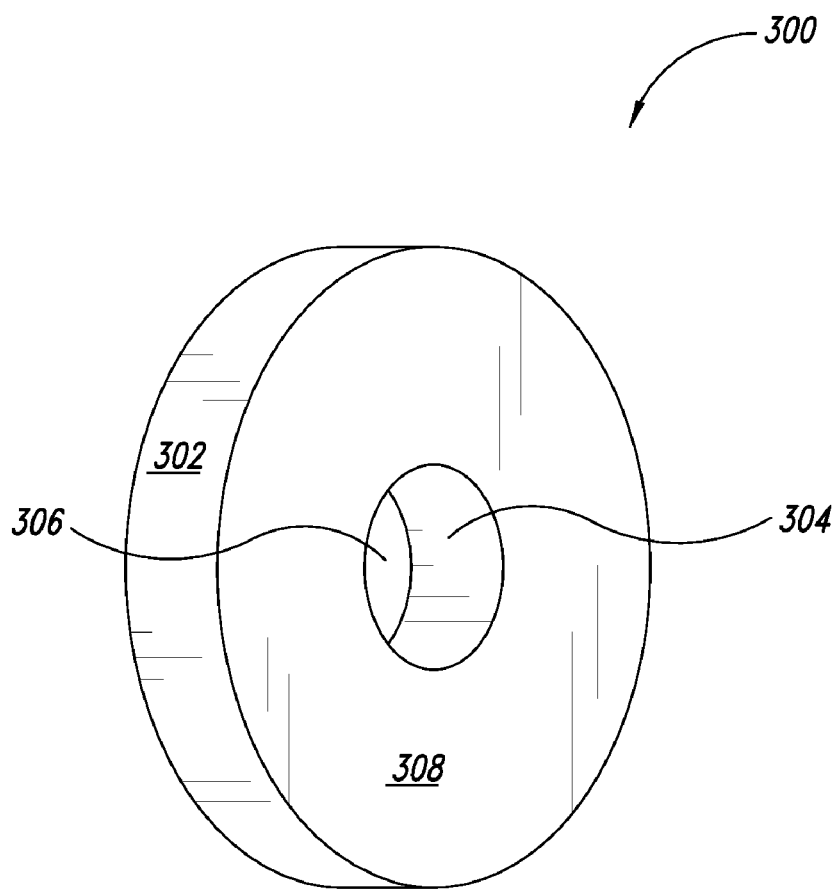
FIG. 3 is an isometric view of an alignment device, according to one illustrated embodiment.

FIG. 3 shows an alignment device 300 that can help align a mandrel before and/or during installation of a structural member. For example, the alignment device 300 can be placed over the mandrel 106 of FIG. 1 before the mandrel 106 is moved through the opening 108 in the structural member 102. Once the mandrel 106 and alignment device 300 are assembled, the mandrel 106 can be engaged by the guide members 110 of the installation tool 112. The alignment device 300 can be securely retained on the mandrel 106 before, during, and/or after the radial expansion of the structural member 102 to ensure proper mandrel alignment throughout the installation process.

The illustrated alignment device 300 of FIG. 3 includes an outer perimeter 302, an inner perimeter 304 forming an opening 306, and a first surface 308 that can abut a second surface 409 (FIG. 4) of a workpiece 404. The opening 306 is sized to be smaller than a major diameter portion located along an expansion portion of a mandrel (e.g., the expansion portion 114 of the mandrel 106 of FIG. 1). In some embodiments, the alignment device 300 is disk shaped and made from a resilient material that allows the inner perimeter 304 to be deformed. For example, the alignment disk 300 can be radially expanded by the expansion portion 114 of the mandrel 106. If the alignment device 300 is reusable, the alignment disk 300 can undergo elastic deformation. Once the mandrel 106 is pulled through the alignment disk 300, the inner perimeter 304 can then return to its original configuration. As such, the alignment device 300 can expand and contract repeatedly to install any number of structural members.

The alignment disk 300 can be formed, in whole or in part, of plastics, polymers, rubbers, elastomers, and the like. In some embodiments, the alignment disk 300 is formed of nylon, or similar material. The number and type of materials forming the alignment disk 300 can be selected based on various installation parameters, such as the mandrel configuration, desired clamp-up forces, installation tolerances, or the like.

Figure 4:
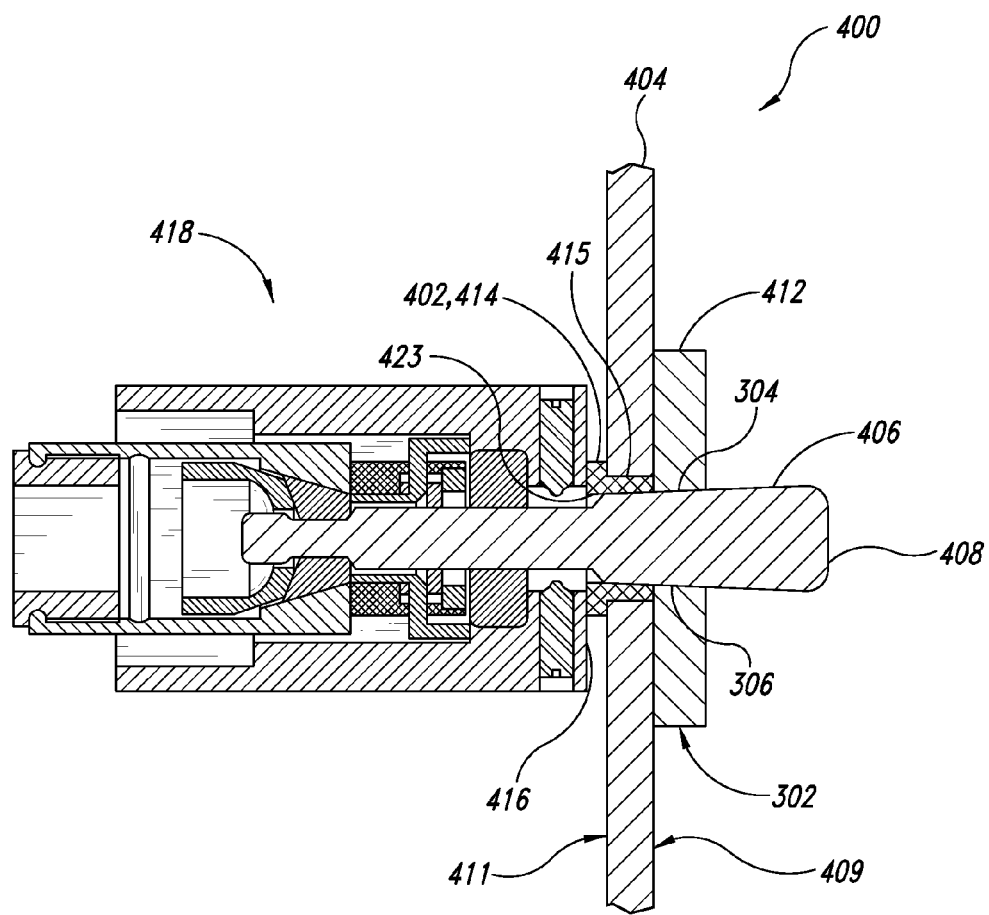
FIG. 4 is a cross-sectional view of an installation tool pulling a mandrel through an alignment device and a structural member while contemporaneously aligning the structural member with a workpiece, according to one embodiment.

FIG. 4 shows an alignment device 412 that can help position an expansion mandrel 408 in order to facilitate proper installation of a structural member 402. An installation tool 418 and the alignment device 412 cooperate to position the structural member 402 with respect to an opening 415 in the workpiece 404.

Generally, the alignment device 412 can help reduce, limit, or substantially eliminate unwanted misalignment of the expansion mandrel 408 attributable to the factors noted above, or other factors that may contribute to mandrel misalignment. When the alignment device 412 is pulled against the workpiece 404, the alignment device 412 biases the expansion mandrel 408 towards a desired position. For example, the illustrated alignment device 412 keeps the expansion mandrel 408 generally perpendicular to both a midplane of the alignment device 412 and a midplane of the workpiece 404. As such, the alignment device 412 can urge the mandrel 408 towards a concentric position with respect to an opening 423 in the structure member 402 and/or the opening 415 in the workpiece 404.

Figure 5:
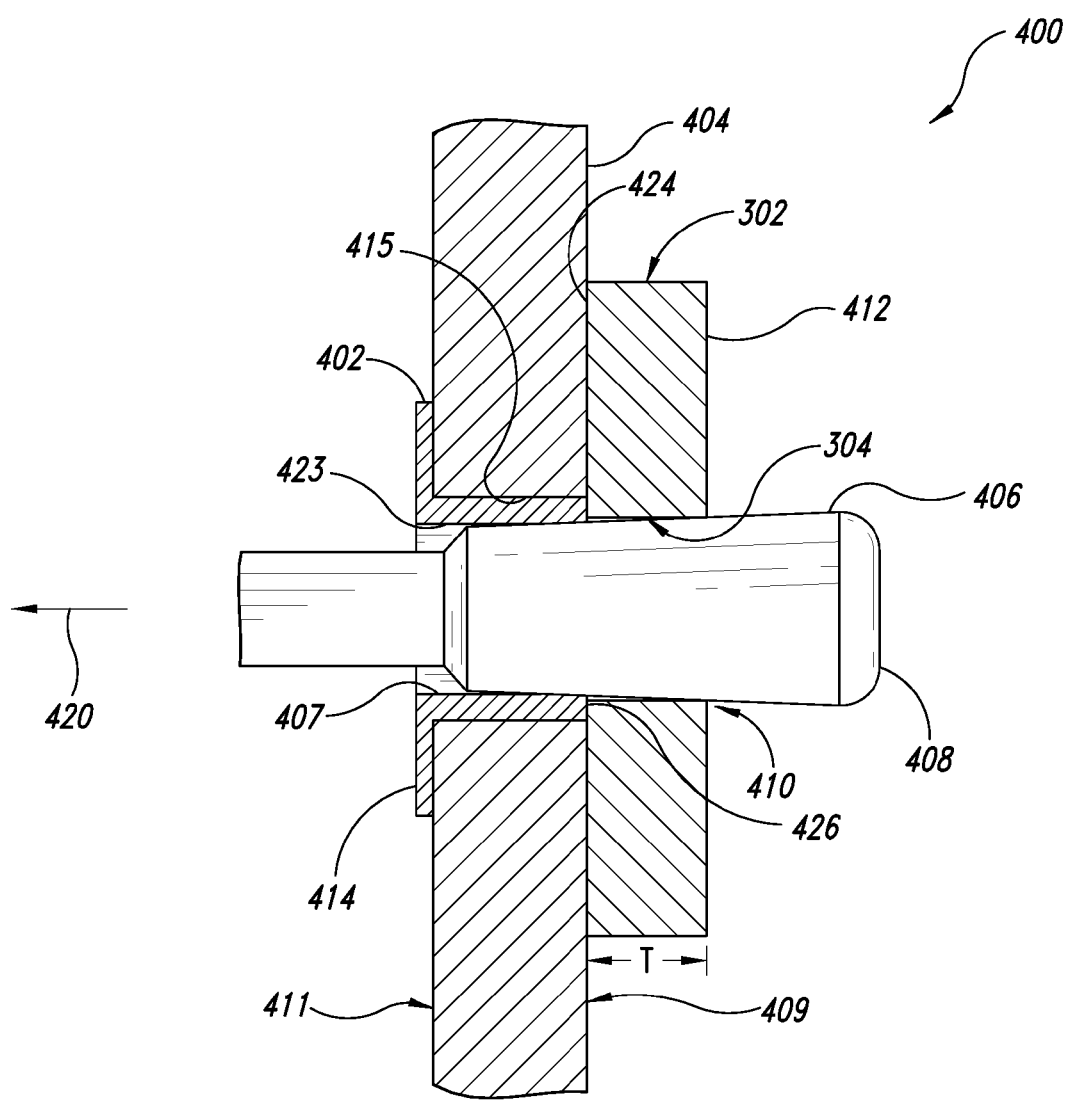
FIG. 5 is a cross-sectional view of the installation of FIG. 4, but not showing the installation tool, according to one embodiment.

FIGS. 4 and 5 show the installation 400 having the structural member 402 about to be radially expanded into the workpiece 404. An expansion portion 406 of the mandrel 408 is first passed through an opening 410 in the alignment device 412. The alignment device 412 can be positioned against the second surface 409 of the workpiece 404, which is opposite a first surface 411 that abuts a radial flange 414 of the structural member 402. The workpiece 404 is thus sandwiched between the radial flange 414 and the alignment device 412.

As the expansion portion 406 of the mandrel 408 begins to radially expand an inner perimeter 407 of the alignment device 412, the alignment device 412 is pulled into tight contact with the second surface 409 of the workpiece 404. A nose-cap section 416 of an installation tool 418 can urge the radial flange 414 into tight contact with the first surface 411 of the workpiece 404. The radial flange 414 and the alignment device 412 can compress the workpiece 404 while the mandrel 408 is moved into proper alignment.

The opening 410 can be smaller than at least a portion of the mandrel 408. For example, the opening 410 can have a diameter that is smaller than the major diameter of the mandrel 408 such that the mandrel 408 expands the opening 410 when the mandrel 408 is moved through the opening 410. In some embodiments, inner perimeter 407 and a region located adjacent the inner perimeter 407 of the alignment device 412 are elastically resilient when radially expanded by the major diameter the mandrel 408. In some embodiments, the inner perimeter 407 and a region located adjacent the inner perimeter 407 of the alignment device 412 are plastically deformed when radially expanded by the major diameter of the expansion portion of the mandrel.

The force resistance provided by the alignment device 412, when located against the second surface 409 of the workpiece 404, allows mandrel pull force 420 generated by the tool 418 to respectively align the structural member 402, the workpiece 404, and the mandrel 408, thus overcoming some of the problems and/or drawbacks discussed in the Description of the Related Art. For example, the alignment device 412 can be pulled against the workpiece 404 without damaging the workpiece 404 because of the alignment device 412 being made of a somewhat soft material as compared to the workpiece 404. The flange 414 can be parallel to and abut the first surface 411.

With continued reference to FIG. 5, a contacting surface 424 of the alignment device 412 is sized to abut at least a portion of an end surface 426 of the structural member 402 and the second surface 409 of the workpiece 404. Both the end surface 426 and the second surface 409 of the workpiece 404 can bear against the contacting surface 424 of the alignment device 412 to ensure proper orientation of the structural member 402. In some embodiments, the end surface 426 of the structural member 402 can be spaced from the contacting surface 424 during installation. Such embodiments can help reduce, limit, or substantially prevent damage to the end surface 426. Because the mandrel 408 is properly aligned with the opening 415 during the expansion process, the end surface 426 of the structural member 402 can be installed at a desired position and orientation. For example, the end surface 426 can be generally parallel to the second surface 409 of the workpiece 404. The end surface 426 can be approximately flush with the second surface 409, if needed or desired. The alignment device 412 can be used to achieve a wide variety of installations that have improved corrosion resistance, improved loading conditions, reduced stresses during service, increased bearing area, or the like.

The alignment device 412 can significantly improve the alignment of the installed structural member 402 as compared to a structural member installed without the aid of the alignment device, such as the structural member 202 of FIG. 2. In some non-limiting embodiments, the alignment device 412 can have a thickness T is at least about ¼ of the diameter of the opening 410. In some embodiments, the thickness T is approximately equal to the diameter of the opening 410. The thickness T can be increased or decreased to increase or decrease the rigidity of the alignment device 412 so as to adjust the amount of play between the expansion mandrel 408 and the workpiece 404.

Figure 6:
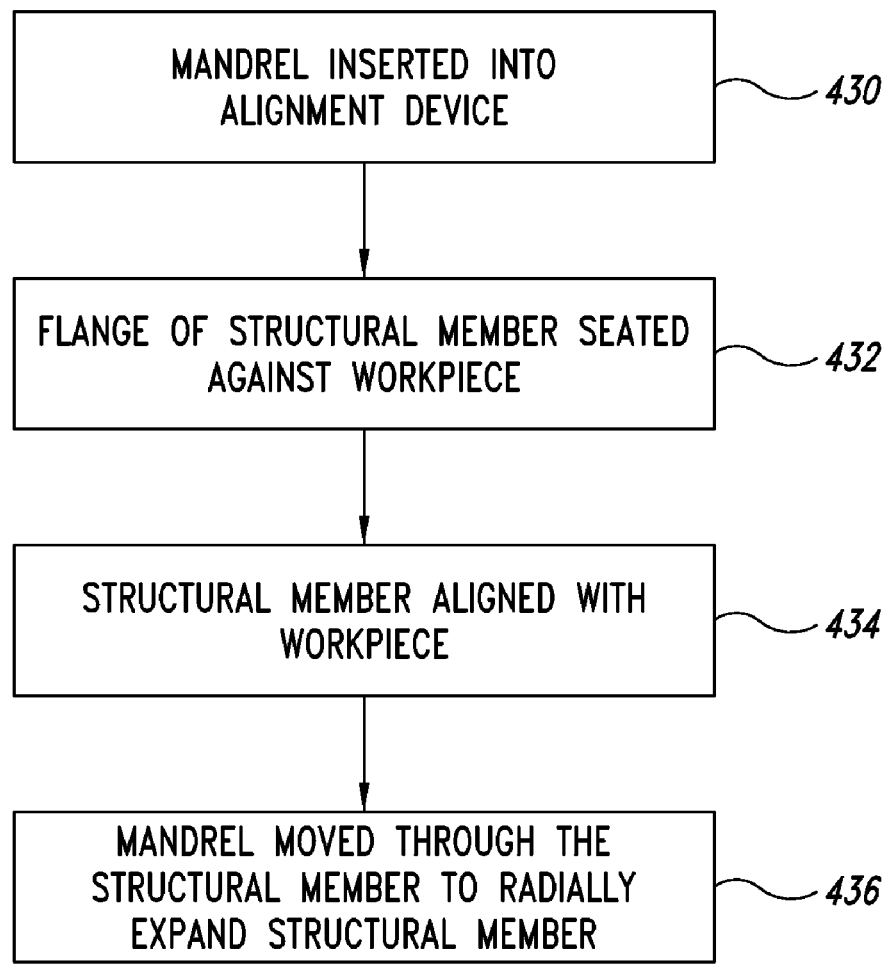
FIG. 6 is a flow chart of one method of using an alignment device to install a structural member, according to one illustrated embodiment.

FIG. 6 is a flow chart of one method of installing a structural member utilizing the alignment device 412 of FIG. 5. At 430, the expansion portion 406 of the mandrel 408 is inserted into the opening 410 in the alignment device 412. The alignment device 412 can then be moved against the workpiece 404. At 432, the radial flange 414 of the structural member 402 is seated against the workpiece 404 as the expansion portion 406 of the mandrel 408 is pulled through the opening 410 of the alignment device 412. If the alignment device 412 includes a receiving region (discuss in connection with FIGS. 9 and 10), the receiving region can be aligned with any portion of the structural member 412 that protrudes from the workpiece 404. At 434, the structural member 402 is aligned with the workpiece 404 as the expansion portion 406 is pulled through the opening 410 of the alignment device 412. At 436, the expansion portion 406 of the mandrel 408 is moved through the structural member 402 to radially expand and secure the structural member 402 to the workpiece 404.

Figure 7:
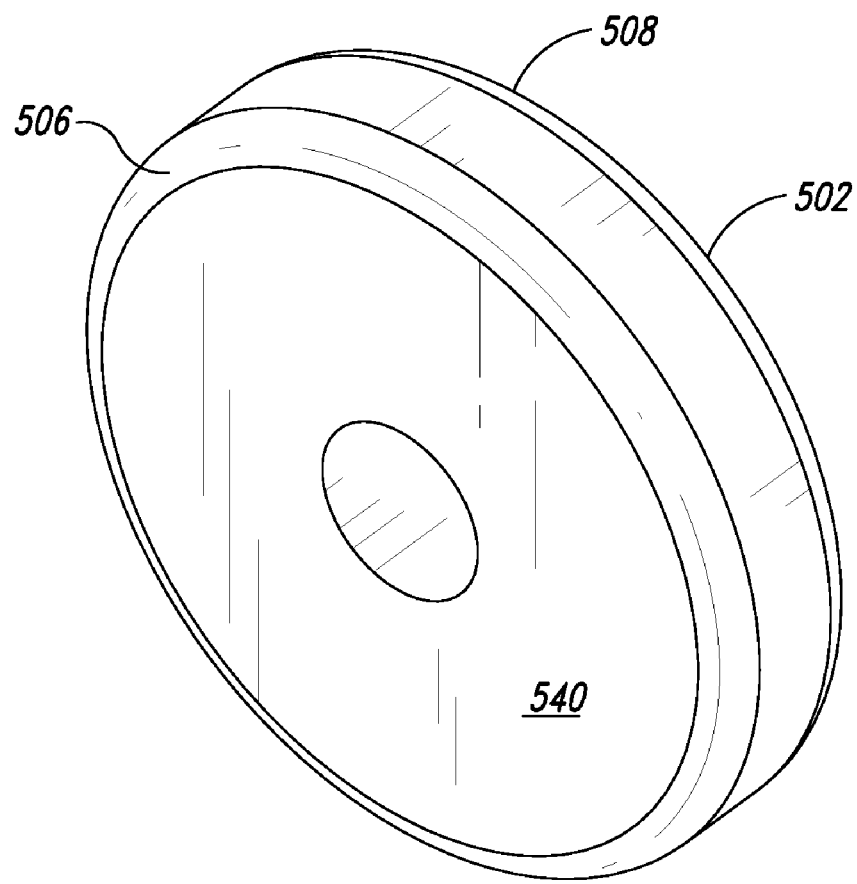
FIG. 7 is an isometric view of another alignment device, according to one embodiment.

FIG. 7 shows an alignment device 502 with blunt or rounded edges 506, 508. The blunt edges 506, 508 provide a comfortable grip for a user. Additionally, the blunt edges 506, 508 can reduce the likelihood of damage (e.g., scratching, dents, or the like) to a surface of a workpiece.

Figure 8:
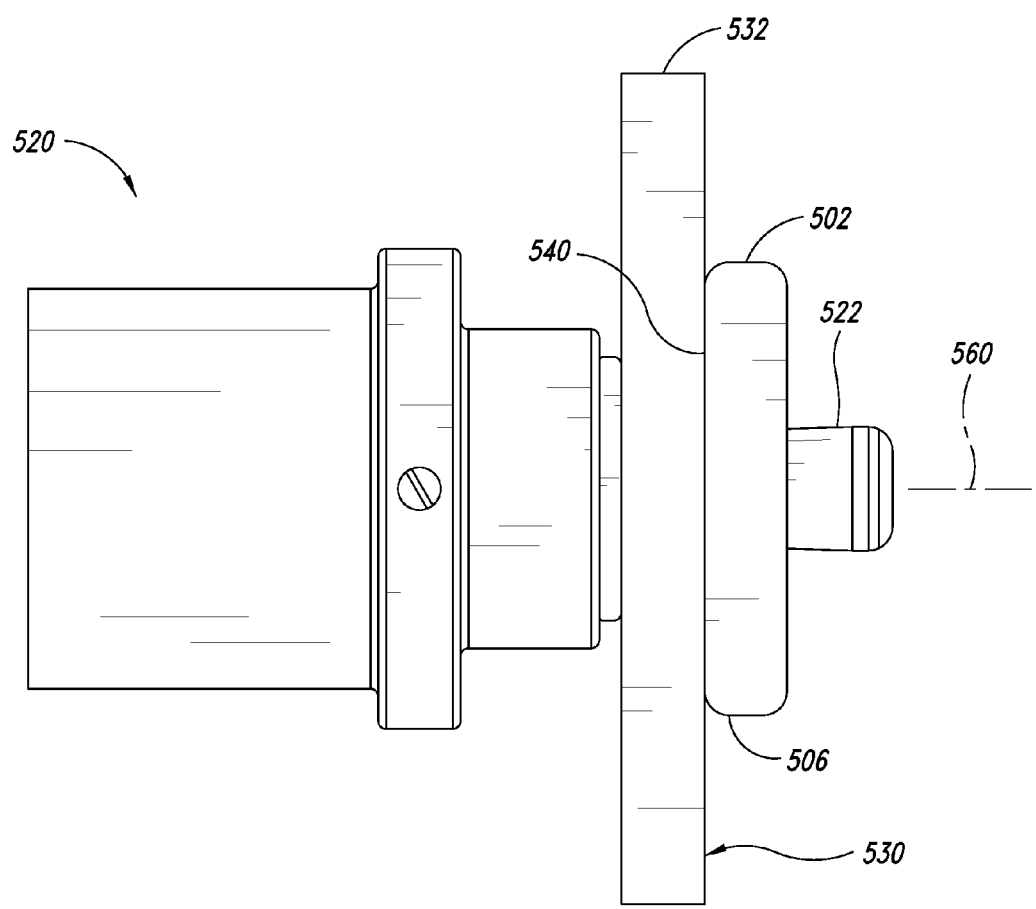
FIG. 8 is a side elevational view of another installation utilizing an installation tool to pull a mandrel through an alignment device to install a structural member, according to one embodiment.

FIG. 8 shows an installation tool 520 with an expansion mandrel 522 engaging the alignment device 502 during an installation processes. The blunt edge 506 can slide easily along a surface 530 of a workpiece 532 to facilitate proper radial alignment of the alignment device 502 with respect to the mandrel 522. During actuation of the mandrel 522, a contacting surface 540 of the alignment device 502 can be generally perpendicular to the line of action of the mandrel (indicated by the phantom line 560).

Figure 9:
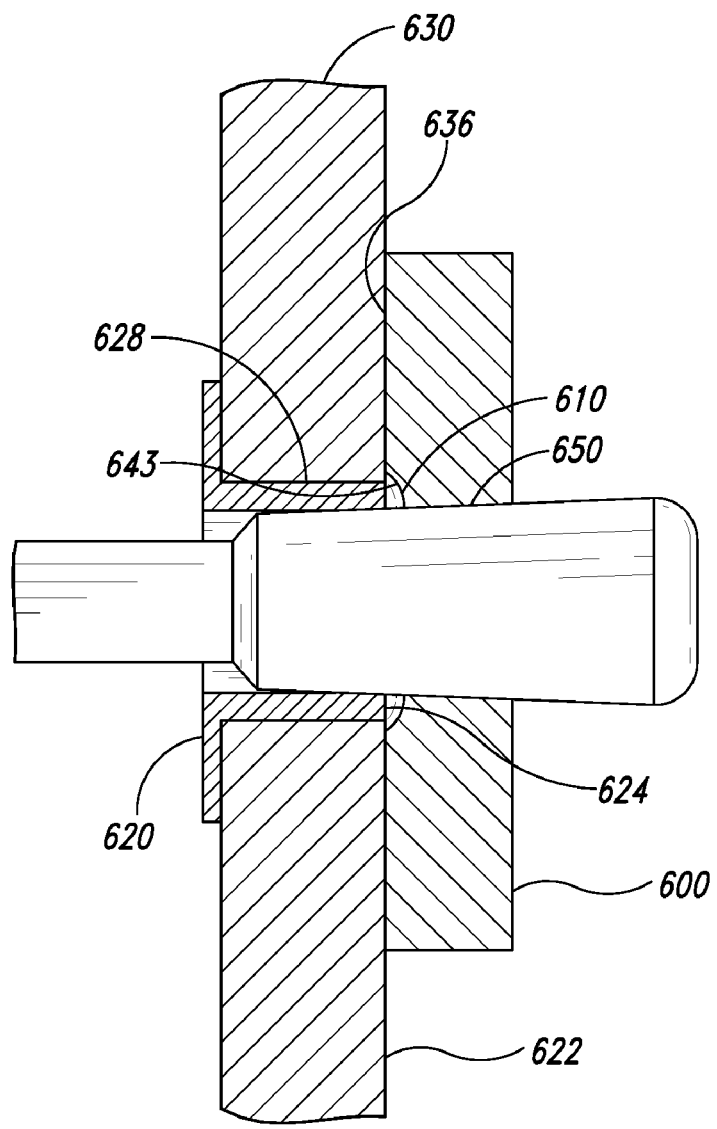
FIG. 9 is a cross-sectional view of an installation utilizing an alignment device with a receiving region for clearing a portion of a structural member, according to one embodiment.

FIG. 9 shows an alignment device 600 having a receiving region 610 that receives at least a portion of a structural member 620. The illustrated structural member 620 includes an end 624 that protrudes from a workpiece 630 and into the receiving region 610. The alignment device 600 may not contact the structural member 620 throughout the entire installation process to prevent damage to the structural member 620 and to allow a contacting surface 636 of the alignment device 600 to abut the workpiece 630. During radial expansion of the structural member 620, the alignment device 600 is pulled against a surface 622 of the workpiece 630 surrounding the opening 628 in which the structural member 620 is installed.

The receiving region 610 can surround and is adjacent an opening 650, which extends through the alignment device 600. In some embodiments, the receiving region 610 is a recess, counterbore, pocket, or other feature that provides a desired amount of clearance between the structural member 620 and the alignment device 600. The illustrated receiving region 610 is a recess that extends radially outward from the opening 650 past the end 624 of the structural member 620. In some embodiments, the receiving region 610 can have a surface 643 that is frusto-conical, partially spherical, stepped, or with any other suitable configuration selected based the configuration of the structural member 620.

Figure 10:
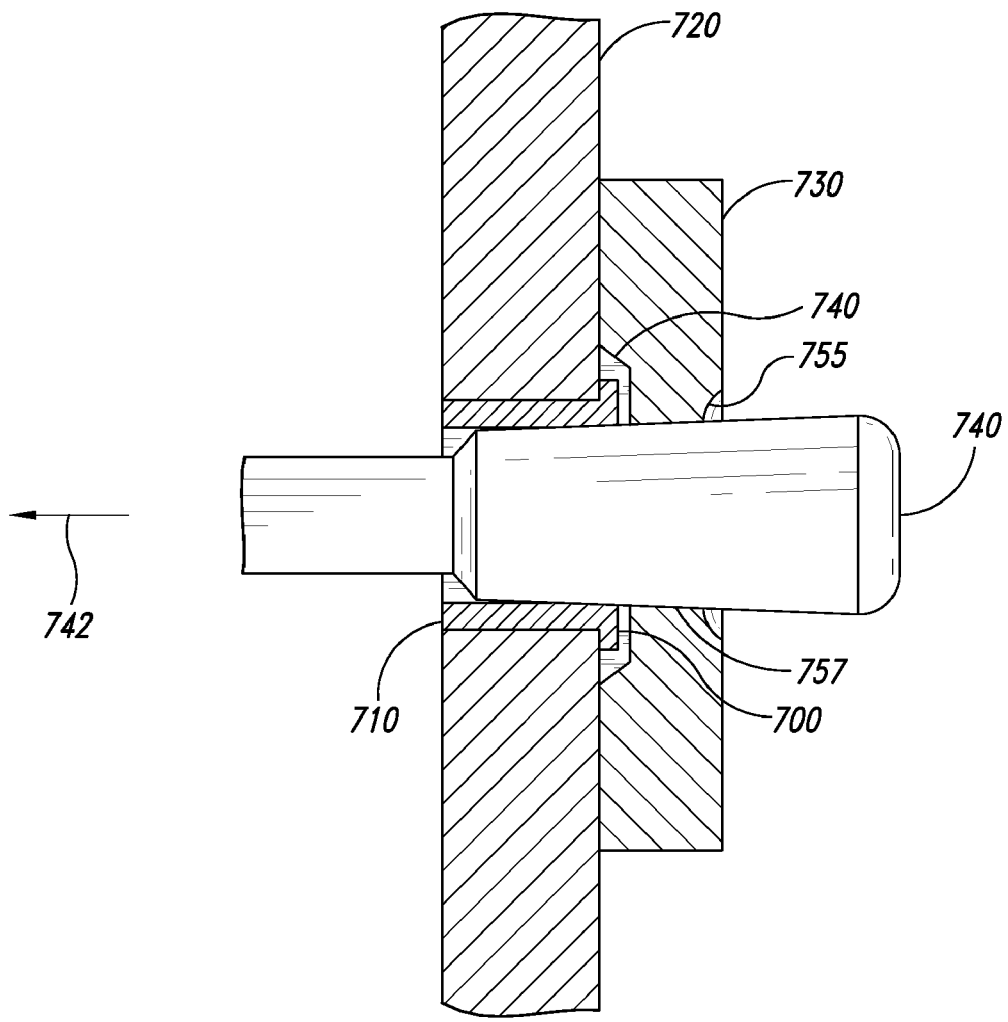
FIG. 10 is a cross-sectional view of an installation utilizing an alignment device with opposing receiving regions, according to one embodiment.

Other portions of a structural member can also be received by a receiving region of an alignment device. FIG. 10 shows a flange 700 of a structural member 710 positioned on a backside of a workpiece 720. The flange 700 can be susceptible to damage when contacted with an installation device. An installer can position the flange 700 within a receiving region 740 to protect the flange 700 during installation. Both the flange 700 and the alignment device 730 can be pulled against the workpiece 720 as a mandrel 740 is pulled axially, as indicated by the arrow 742. Thus, the alignment device 730 can be used to install structural members 710 with flanges (e.g., thin flanges) that are easily damaged.

The alignment device 730 also includes a receiving region 755 opposing the receiving region 740. An inner surface 757 of the alignment device 730 extends between the receiving regions 740, 755. The receiving regions 740, 755 can be used to receive different portions of structural members. For example, the receiving region 755 can receive an end of a structural member (similar to the receiving region 610 of FIG. 9). An installer can use the alignment device 730 to install structural members at different orientations and positions.

Figure 11:
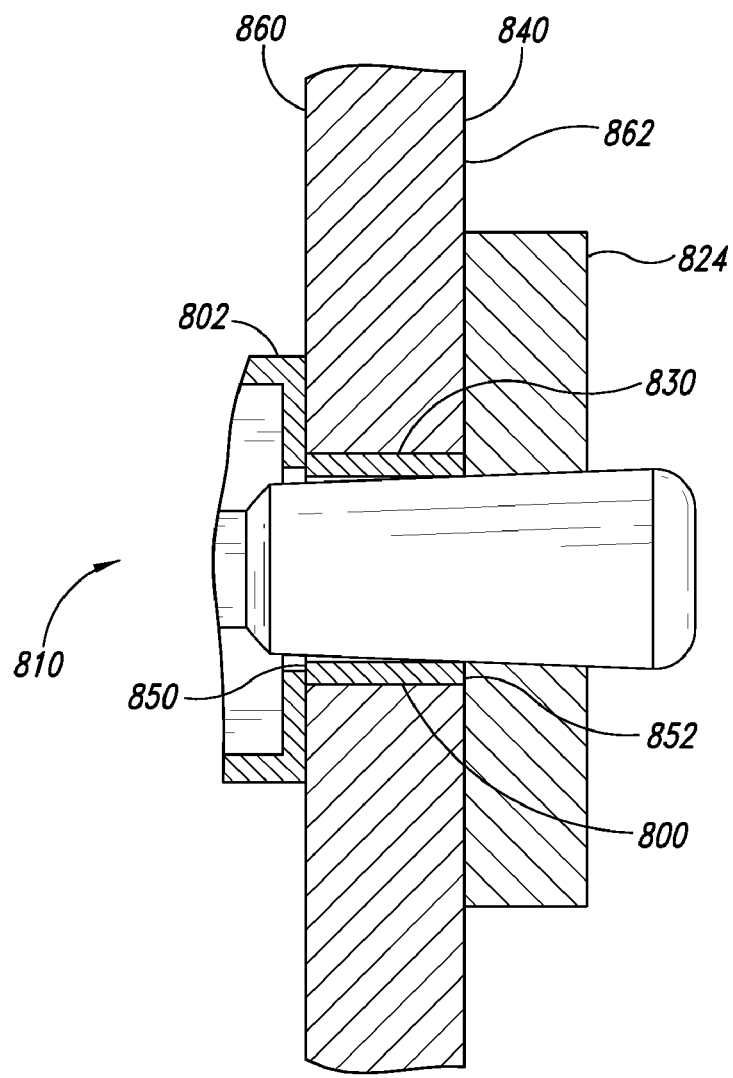
FIG. 11 is a cross-sectional view of an installation with a structural member without a flange, according to one illustrated embodiment.
Figure 12:
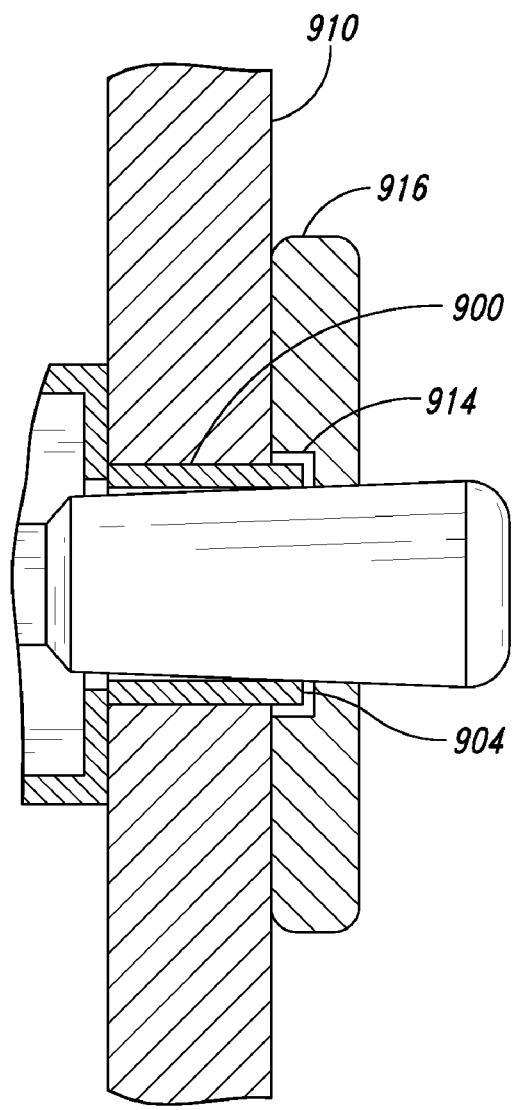
FIG. 12 is a cross-sectional view of an installation with a structural member having a threaded section disposed in a receiving region of an alignment device, according to one illustrated embodiment.

Alignment devices can be used to install structural members without flanges, conventional bushings, sleeves, liners, or the like. FIG. 11 shows a structural member 800 in the form of a straight bushing without a flange. A nose cap 802 of an installation tool 810 and an alignment device 824 can hold the structural member 800 in an opening 830 of a workpiece 840. Opposing ends 850, 852 of the structural member 800 can be generally parallel with a first surface 860 and a second surface 862 of the workpiece 840, respectively. Additionally or alternatively, one or both ends 850, 852 can be generally flush with or spaced from the respective surfaces 860, 862. For example, FIG. 12 illustrates a structural member 900 having a threaded section 904 extending outwardly from a workpiece 910 and into a receiving region 914 (illustrated as a counterbore of an alignment device 916.

The various embodiments described above can be combined to provide further embodiments. All of the above U.S. patents, patent applications and publications referred to in this specification as well as U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; 5,433,100; and in U.S. Patent Application No. 60/796,171; Ser. No. 09/603,857; Ser. No. 10/726,809 (U.S. Pat. No. 7,100,264); Ser. No. 10/619,226 (U.S. Pat. No. 7,024,908); Ser. No. 10/633,294 (US/2005/0025601); Ser. No. 12/590,990; and Ser. No. 11/796,544 (U.S. Pat. No. 7,617,712) are incorporated herein by reference. Aspects can be modified, if necessary, to employ devices, features, and concepts of the various patents, applications, and publications to provide yet further embodiments.

These and other changes can be made in light of the above-detailed description. In general, in the following claims, the terms used should not be construed to limit the invention to the specific embodiments disclosed in the specification and the claims, but should be construed to include all types of structural members that are installable in an opening of a workpiece and that operate in accordance with the claims. Accordingly, the invention is not limited by the disclosure, but instead its scope is to be determined entirely by the following claims.

What is claimed is:

1. An installation system for installing a structural member in a workpiece, the installation system comprising:
    a mandrel configured to be coupled to an installation tool, the mandrel including a major circumference portion dimensioned to expand the structural member; and
    an alignment device including:
        a first surface;
        a second surface; and
        an inner surface defining a passage extending between the first surface and the second surface, wherein material forming the inner surface is deformable and is sufficiently resilient to align the mandrel with the structural member as the major circumference portion passes through and expands the passage of the alignment device.

2. The installation system of claim 1, wherein the alignment device is a non-metal disk.

3. The installation system of claim 1, wherein the material of the alignment device is elastically deformable from an initial configuration to an expanded configuration by the major circumference portion moving through the passage, the material of the alignment device is capable of returning to the initial configuration when the passage is not held open by the major circumference portion of the mandrel.

4. An installation system for installing a member in a workpiece, the installation system comprising:
    a mandrel including a tapered expansion portion; and
    an alignment device having a passage configured to receive the mandrel, the alignment device is adapted to be elastically deform by the tapered expansion portion and to position the mandrel relative to the member when the alignment device contacts a first side of the workpiece and an installation tool is positioned on a second side of the workpiece and the installation tool pulls at least a portion of the mandrel through the alignment device contacting the first side of the workpiece.

5. The installation system of claim 4, wherein the alignment device is a non-metal disk.

6. The installation system of claim 4, wherein the alignment device is made of a material capable of being repeatedly elastically expanded by the mandrel from an initial configuration to an expanded configuration.

7. The installation system of claim 4, wherein a circumference of the passage is smaller than a circumference of the tapered expansion portion.

8. The installation system of claim 4, wherein the tapered expansion portion and passage are dimensioned such that the tapered expansion portion radially expands the passage only by elastic deformation.

9. A method of installing a structural member into an opening of a workpiece, the method comprising:
    moving an expansion portion of a mandrel into an opening of an alignment device in an initial configuration;
    elastically deforming the alignment device using the mandrel; and allowing the alignment device to position the mandrel relative to the workpiece while the alignment device is pulled towards the workpiece and the mandrel extends through the alignment device and through the structural member; and expanding the structural member using the expansion portion of the mandrel while a section of the mandrel is positioned in the opening of the alignment device.

10. The method of claim 9, wherein elastically deforming the alignment device includes elastically deforming non-metal material of the alignment device defining the opening.

11. The method of claim 9, wherein elastically deforming the alignment device comprises deforming the material defining and surrounding the opening without causing any appreciable amount of plastic deformation of the material.

12. The method of claim 9, further comprising:

moving a first section of the expansion portion into the opening of the structural member while a second section of the expansion portion keeps at least a portion of the alignment device elastically deformed.

13. A method of installing a member in a workpiece, the method comprising:

pulling a mandrel through an alignment device positioned in a first side of the workpiece using an installation tool coupled to the mandrel and positioned on a second side of the workpiece;

expanding the alignment device and member using the mandrel;

separating the alignment device from the expandable member; and installing another member using the alignment device.

14. The method of claim 13, further comprising:

elastically expanding the alignment device; and plastically expanding the member to couple the member to the workpiece.

15. The method of claim 13, further comprising aligning the mandrel relative to the workpiece by pulling the alignment device against the first side of the workpiece prior to installing the member in the workpiece.

16. The method of claim 13, wherein a thickness of the alignment device is at least about ¼ of a diameter of an opening of the alignment device through which the mandrel is pulled.

* * * * *

UNITED STATES PATENT AND TRADEMARK OFFICE
CERTIFICATE OF CORRECTION

PATENT NO. : 8,191,395 B2  
APPLICATION NO. : 13/047643  
DATED : June 5, 2012  
INVENTOR(S) : Douglas W. Glenn Page 1 of 1

It is certified that error appears in the above-identified patent and that said Letters Patent is hereby corrected as shown below:

Title Page 2 Item (56):
"GB   593604   10/1947" should read, --GB   593607   10/1947--.

Signed and Sealed this
Nineteenth Day of February, 2013

Teresa Stanek Rea
*Acting Director of the United States Patent and Trademark Office*